United States Patent [19]
Feiken

[11] Patent Number: 5,635,695
[45] Date of Patent: Jun. 3, 1997

[54] CHIP CARD BASED PAYMENT SYSTEM HAVING AN ON-CARD FLAG FOR SPECIFYING PROPER COMPLETION OF A PRIOR CARD BALANCE REPLENISHMENT SESSION

[75] Inventor: Albertus Feiken, Amstelveen, Netherlands

[73] Assignee: Koninklijke PTT Nederland N.V., Groningen, Netherlands

[21] Appl. No.: 519,253

[22] Filed: Aug. 25, 1995

[30] Foreign Application Priority Data

Aug. 31, 1994 [NL] Netherlands ............... 9401406

[51] Int. Cl.$^6$ .................................... G06K 5/00
[52] U.S. Cl. ................. 235/380; 235/382; 235/436
[58] Field of Search ..................... 235/380, 375, 235/381, 492, 487, 493, 382

[56] References Cited

U.S. PATENT DOCUMENTS

| | | | |
|---|---|---|---|
| 4,845,351 | 7/1989 | Hara et al. | 235/492 |
| 4,877,945 | 10/1989 | Fujisaki | 235/379 |
| 5,155,342 | 10/1992 | Urano | 235/380 |
| 5,175,416 | 12/1992 | Mansvelt et al. | 235/380 X |
| 5,401,950 | 3/1995 | Yoshida | 235/487 |
| 5,504,701 | 4/1996 | Takahashi et al. | 235/492 X |

FOREIGN PATENT DOCUMENTS

| | | |
|---|---|---|
| 0563997 | 10/1993 | European Pat. Off. . |
| 2689662 | 10/1993 | France . |
| 4230866 | 3/1994 | Germany . |
| 9200857 | 12/1993 | Netherlands . |
| 8902140 | 3/1989 | WIPO . |

Primary Examiner—Donald T. Hajec
Assistant Examiner—Michael G. Lee
Attorney, Agent, or Firm—Michaelson & Wallace; Peter L. Michaelson

[57] ABSTRACT

Improved integrity of a payment system for paying for services or goods, for example, telephone facilities, through use of electronic payment cards. In any session to increase a card balance, a "flag" is placed ("1") on the payment card which indicates that the session must not be interrupted. After completion, the flag is removed again ("0"). A session to pay for the product or the service or to increase the balance can only be established if the flag is absent ("0") indicating that the last session to increase the balance was correctly completed. If, on the other hand, the flag is still "1" at the start of a session, a correction routine is first performed in which the previous session to increase the balance is then correctly concluded to prevent the flag being removed by fraud, the flag can only be removed by a central system (PSTN/ABS) through issurance of an authorized instruction.

10 Claims, 4 Drawing Sheets

CHIP CARD BASED PAYMENT SYSTEM HAVING AN ON-CARD FLAG FOR SPECIFYING PROPER COMPLETION OF A PRIOR CARD BALANCE REPLENISHMENT SESSION

BACKGROUND OF THE INVENTION

The invention relates to a payment system in which use is made of electronic payment cards, in particular "chip cards" or "smart cards". Under consideration in the present application are, in particular, payment cards which can be used for paying call costs in public telephone terminals. However, other services and goods can also be paid for in this way. This development is in fact referred to as a so-called "electronic purse". Under consideration in this connection is the payment of generally none too large amounts by means of electronic payment cards on which a balance is previously entered. Payment takes place by reducing the balance on the card. Of course, measures have to be taken in order to arrange for the balance reduction to benefit the supplier; systems for this purpose are still being developed and tests are taking place in that field. To place an initial balance on the card and increase the balance later, there must be an infrastructure of terminals and the like if this form of payment is to be accepted. It appears possible to use the public telephone terminals for this purpose. Such terminals act as "charging stations" for the electronic payment cards. Of course, the public telephone terminals remain suitable as means for conducting telephone calls and offering any other telecommunication facilities via the downstream central telephone system or telecommunication system. Payment of such telephone calls and any other facilities may, at the same time, take place by means of the "electronic purse". Although the payment of telephone/telecommunication costs, in particular, is considered below, it is emphasized that the invention, as explained below, is not limited thereto and is equally applicable for payment for other services or goods by means of an "electronic purse". The "charging" of payment cards need not occur via telephone terminals either, but can equally well occur via other terminals, for example, terminals which are now used for issuing cash (so-called "cash points").

After a payment card has been provided with an initial balance, that balance is reduced by the telephone terminal in accordance with a rate for the telephone costs. The provision of an initial balance and the replenishment of the balance after the passing of time can also occur via the telephone terminal. To do this, connection has to be made to a central administration system which, onto the one hand, enters the amount desired by the user on the card and, on the other hand, ensures that the amount can be received, for example, by sending an account to the user or via (after authorization) electronic reduction of the balance of a bank account belonging to the user.

The measures proposed according to the present invention are intended to combat errors and frauds in the processes mentioned (the use/payment process and the "balance process").

SUMMARY OF THE INVENTION

The essence of the invention is that a "flag" is placed on the payment card during each balance process throughout the entire process time in order to indicate that the payment card is occupied with an indivisible action, i.e. a process which cannot be interrupted. After said indivisible action has taken place, the flag is removed. The placing and removal of the flag takes place by writing a certain first symbol (for example, "1") or second symbol (for example, "0") into a certain memory location of the payment card. The exploitation process and payment process (the use of the telephone facilities) can only be started after it has been confirmed that there is no flag at said certain memory location, which means that the last balance process was correctly concluded. If there is, in fact, a flag, no connection to the telephone system is set up. Instead thereof, a balance session is set up in which the incorrectly concluded previous session is repeated or is continued and correctly finally concluded on basis of the information still present an the administration system.

In order to prevent the flag from being capable of being removed by fraud, for example by means of a PC and a card terminal (under consideration is the situation where the payment card is pulled out of the terminal during the balance process at the instant when the balance on the card has already been increased while preparation of the invoice (or automatic debit instruction) has not yet taken place) provision is preferably made that the flag can be removed only by the central system which is concerned with increasing the balance. The code signal for removing the flag is therefore, preferably also presented to the payment card, provided with a cryptographic code which the central system denotes as the origin of the code signal (message authentication code, MAC). If this appears to be correct, the code signal is converted into an instruction to replace the first symbol ("1", "flag up") into the second symbol ("0", "flag down"). Preferably, if EEPROM cards are used, various instructions are used to set up the flag and to remove it. For the first action ("0"→"1"), the instruction "WRITE" is used and for the second action ("1"→"0"), the instruction "MODIFY" is used. The difference is:

| bit in buffer | WRITE  | →  | bit in buffer |
|---------------|--------|----|---------------|
| 0             | 0      | →  | 0             |
| 1             | 0      | →  | 1             |
| 0             | 1      | →  | 1             |
| 1             | 1      | →  | 1             |
| bit in buffer | MODIFY | →  | bit in buffer |
| 0             | 0      | →  | 0             |
| 1             | 0      | →  | 0             |
| 0             | 1      | →  | 1             |
| 1             | 1      | →  | 1             |

BRIEF DESCRIPTION OF THE DRAWINGS

The invention is discussed in greater detail below with reference to a diagrammatic representation of a card telephone system in FIG. 1 and four diagrams in FIGS. 2–5.

DETAILED DESCRIPTION

Figure 1:
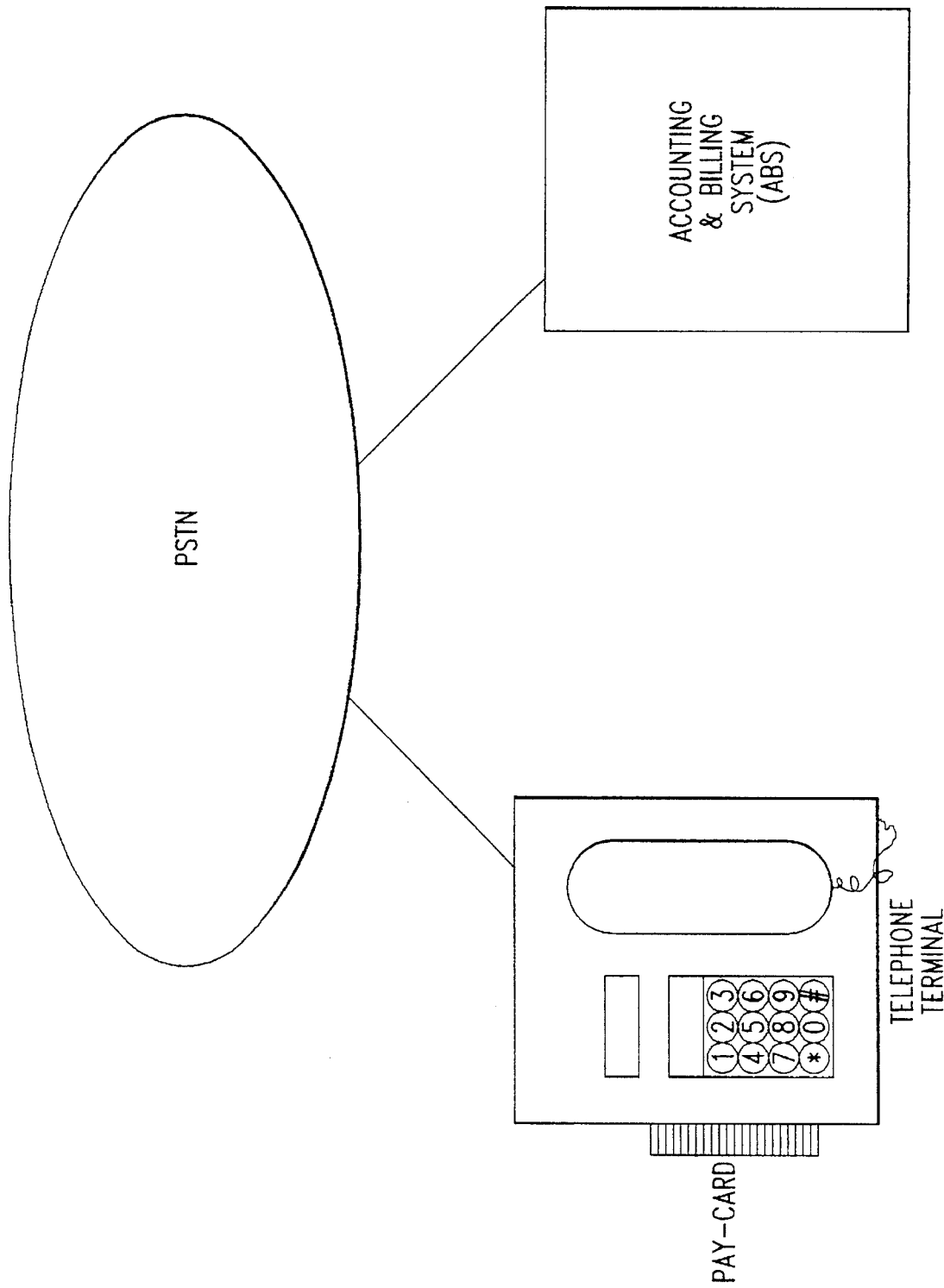
FIG. 1 depicts apparatus, here illustratively a telephone terminal and an accounting and billing system, both interconnected by a telephone network, which embodies the present invention.

FIG. 1 shows, a e.g., public switched telephone network (PSTN) to which a telephone terminal is connected. Payment of telephone costs occurs by periodically reducing a balance stored in an electronic payment card. The balance stored in the card can be increased by inserting the card into the terminal. Connection is made to an "Accounting & Billing" system (ABS) connected to the PSTN in a menu-controlled dialog with the terminal (via the keyboard and display window of the terminal). After a balance desired by the user has been entered (for which the user receives an invoice from the ABS), the payment card can be used to start a telephone session with the PSTN, the costs of which are paid by periodically debiting the balance. The payment card contains, inter alia, an electrically erasable programmable read only memory (EEPROM).

Figure 2:
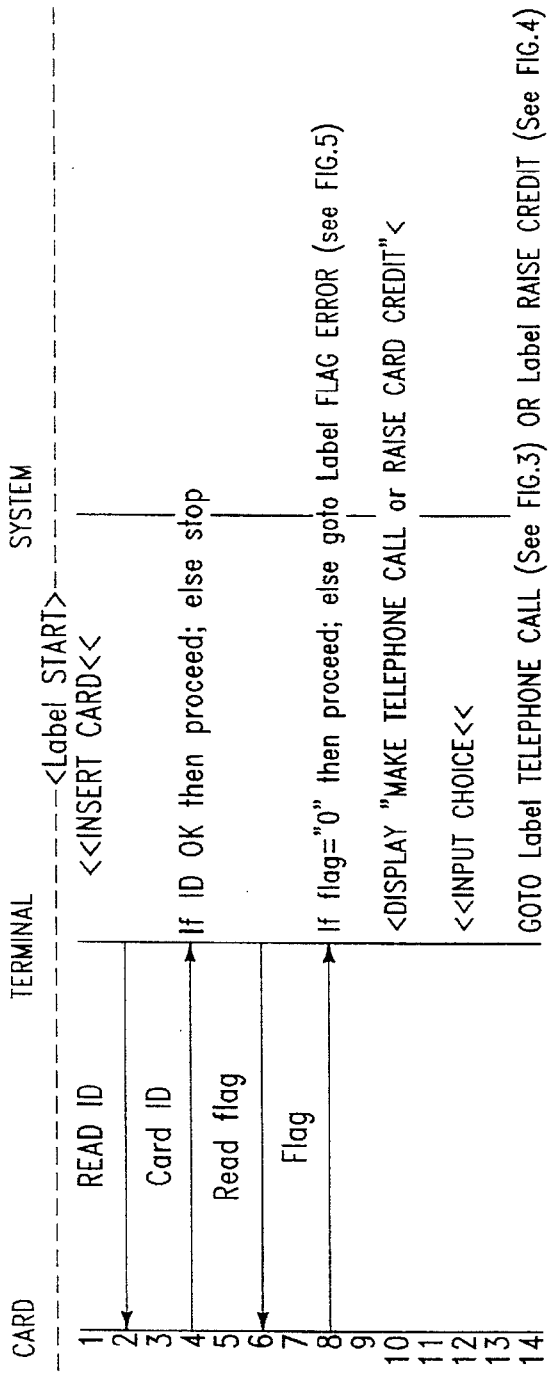
FIGS. 2–5 each depicts a particular protocol occurring among the telephone network (system), the terminal and a payment card for a corresponding mode of operation involving the present invention.

The diagram of FIG. 2 diagrammatically shows a protocol which occurs after a user has inserted his payment card into the terminal.

Figure 3:
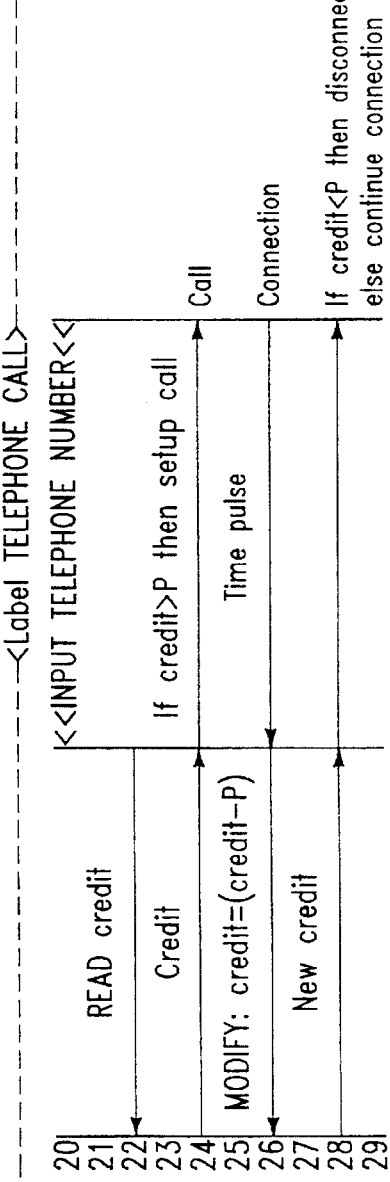

After the card has been inserted into the terminal and the identity has been established and authorized (like further protocol details, this is not indicated in the figures), the "flag" of the payment card is read. (lines 1–7) This normally has (in this example) the value "0": "flag down". If the flag is down, a telephone connection set-up can be started, which is illustrated in FIG. 3. In place thereof, an action can also be started to increase the card balance, see FIG. 4. If the flag has the value "1" ("flag up"), something is not in order and an error routine is first processed; this is shown in FIG. 5. (lines 8–14)

FIG. 3 shows a protocol for set-up and payment of a telephone call through of the card balance. In this process, the initial balance is first investigated to determine whether it is sufficient (lines 20–24); thereafter the connection is set up and periodically an amount P is deducted from the card balance. As soon as the balance is insufficient, the connection is interrupted. (lines 25–29)

Figure 4:
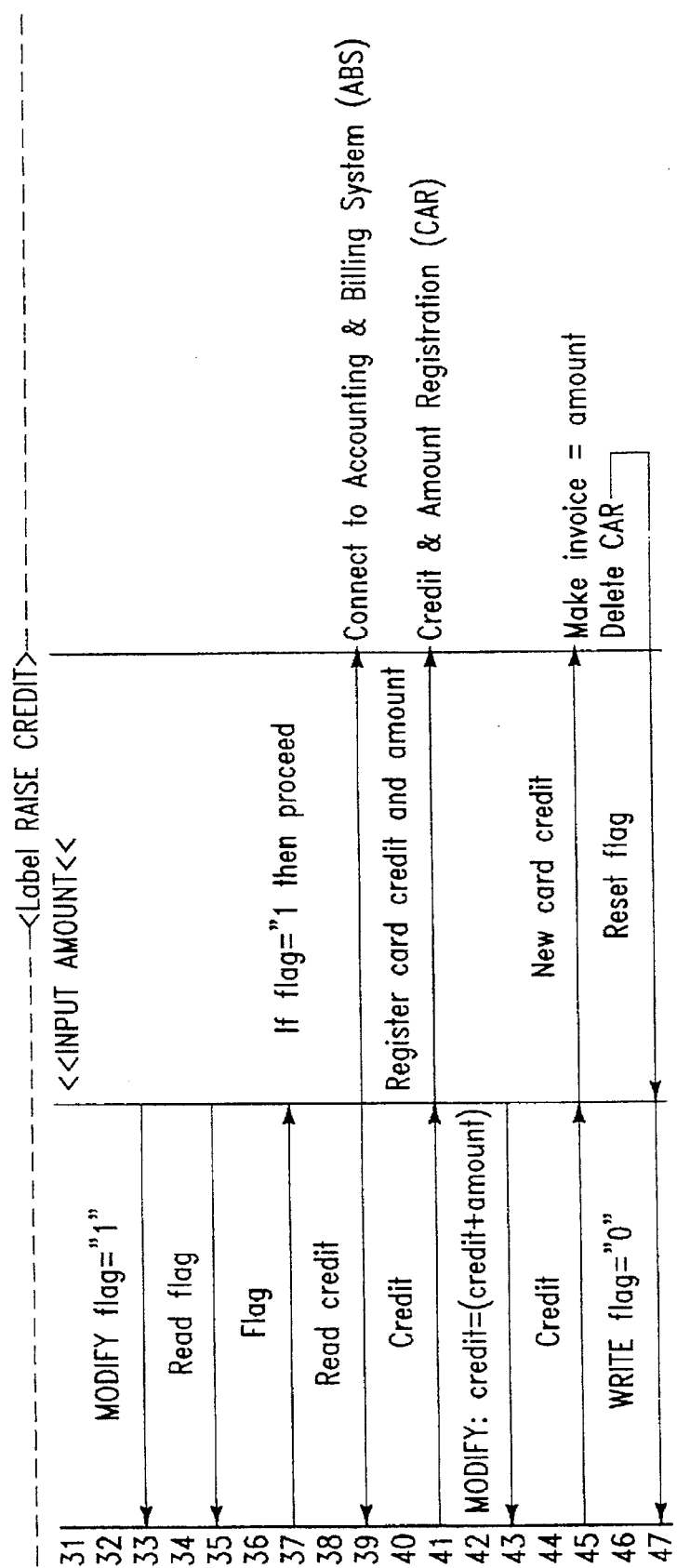
Figure 5:
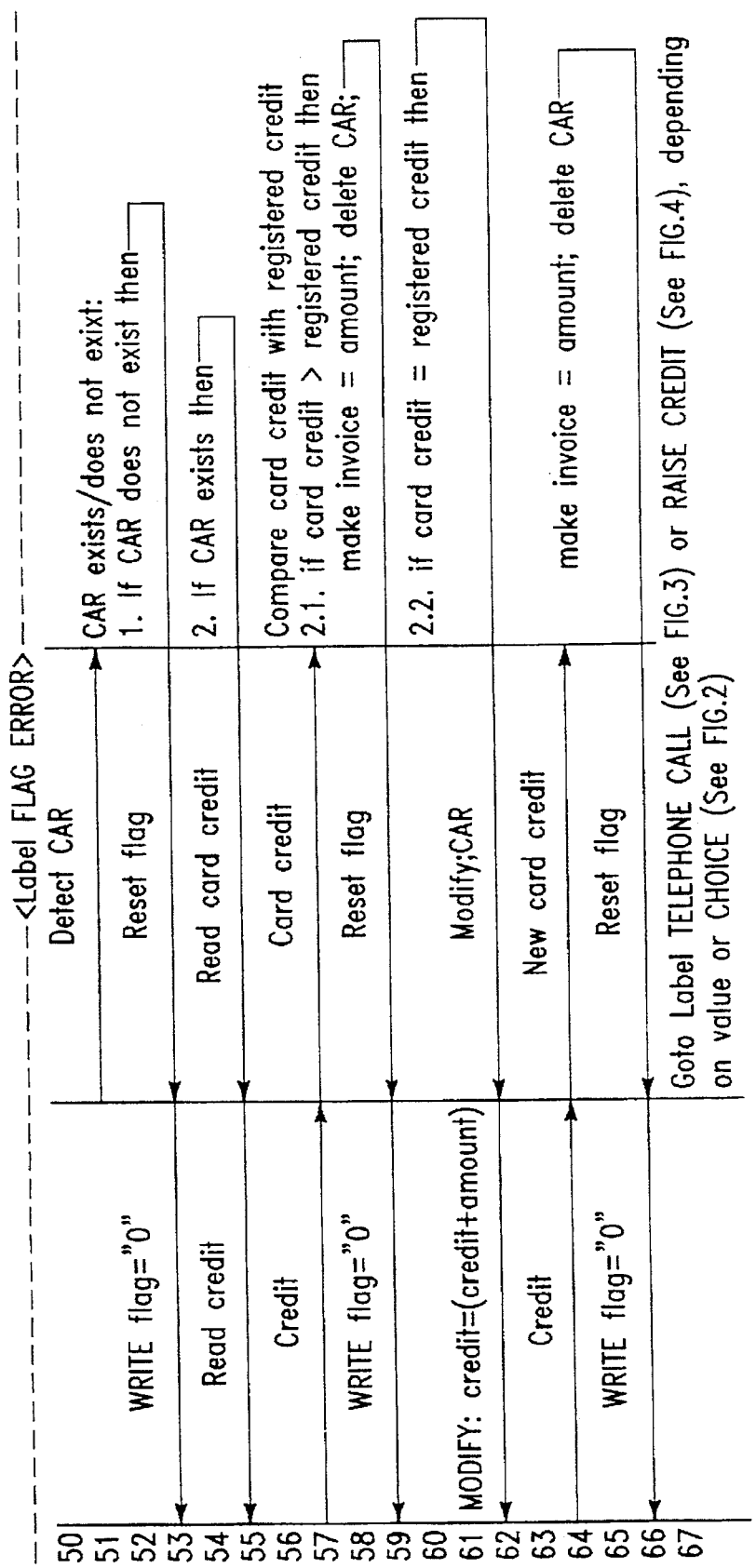

FIG. 4 shows a protocol for increasing the card balance. The first action is to raise the flag ("1"). (lines 31–33) This indicates that a "RAISE CREDIT" operation is in progress; only at the end of the latter is the flag lowered ("0"). The amount by which the balance has to be increased is entered via a keyboard of the terminal (the same one as that through which telephone connections can be dialled). After the value of the flag has been read for the purpose of security (it should now be "1"), the card balance is read. (lines 34–39) Connection is also made to ABS (via the telephone network). The card balance and the amount with which the card balance has to be replenished is now transmitted by the terminal to the ABS and registered at the credit and amount registration system (CAR). The terminal then instructs the payment card to increase the balance by the amount (lines 40–43); the card transmits the new balance to the ABS via the terminal. The amount entered is compared in the ABS with the difference between the new and the old card balance and, in the event of agreement, an invoice is prepared for the user. (lines 44–45) The registration of the old card balance in the ABS and the amount entered by the user are then erased. Finally, the flag on the payment card is lowered again. The instruction to do this is received from the ABS using "message authentication" by means of a cryptographic "message authentication code" (MAC). This is checked in the payment card, after which the flag is set by means of a MODIFY instruction to "0". (lines 46–47) The payment card is programmed in such a way that the MODIFY instruction can be carried out only together with a correct MAC. Use of MACs is generally known, inter alia from "Electronic banking using smartcards", SMART CARD '90, Int. Exh. and Conf. PLF Commun., vol. 2, 1990, pages M1–8, or from the book entitled "Security for Communication Networks" by Davis and Price.

FIG. 5 shows a protocol which is processed if, after the payment card has been inserted, it is found that the flag is raised. This indicates that an earlier action to increase the card balance has not been correctly terminated. The incorrectly processed previous action is now correctly terminated by the protocol shown in FIG. 5.

First of all (through lines 50–51), it is determined whether the registration (made during the previous action) of the old card balance and the amount by which the balance had to be increased (CAR) still exist in the ABS. If this information was erased in the previous action, then the only action which has to be carried out is to reset the flag. It may be assumed that only the resetting of the card flag has been omitted in the incorrectly concluded action (lines 52–53).

If the CAR still exists (lines 54–55), it is determined whether the registered card balance is or is not equal to the present card balance (line 56).

If the present card balance is greater than the registered card balance in the CAR, it may be assumed that during the previous session the card balance has, in fact, been increased but that no account thereof has been prepared. In that case, the account is now updated, the CAR is erased and the flag is reset (lines 57–59).

If the present card balance is equal to the card balance registered in the CAR, the previous attempt to increase the balance is now processed, namely on the basis of the amount, known from the CAR, by which the balance had to be increased. The card balance is now increased, the account is prepared, the CAR is erased and the flag is reset (lines 60–66). After an incorrect session to increase the card balance was signalled by detection of the flag and the error was then corrected, the planned session for which the choice was already made (see FIG. 2, lines 12–14) can be started after all (line 67).

I claim:

1. A payment system comprising:

a terminal;

a payment card for communicatively interacting with the terminal so as to effectuate a transaction therethrough;

means, operative in conjunction with a process which increases a balance stored in the card, for changing a symbol stored in the card from a first symbol to a second symbol, wherein said changing means:

detects, at a beginning of said process, if said first or said second symbol is stored in the card;

if said second symbol is stored, changes said second symbol to said first symbol and performs said process to increase the stored balance; and if said first symbol is stored, indicates that a previous execution of said process was interrupted prior to completion and completes or repeats the previous execution of the process.

2. The payment system in claim 1 further comprising a central system connected to the terminal, the terminal being remote from the central system, wherein the central system, upon completion of the process to increase the balance stored in the card, sends a signal to the terminal so as to change the stored symbol from the first symbol to the second symbol.

3. The payment system in claim 2 wherein at the beginning of the process to increase the balance stored in the card, the terminal changes the stored symbol from the second symbol to the first symbol.

4. The payment system in claim 3 wherein the payment card comprises an electrically erasable programmable read only memory (EEPROM) and the stored symbol is changed from the second symbol to the first symbol as a result of a WRITE instruction executed by the card.

5. The payment system in claim 2 wherein the payment card comprises an electrically erasable programmable read only memory (EEPROM) and the stored symbol is changed from the first symbol to the second symbol as a result of a MODIFY instruction executed by the card.

6. A method for use in a payment system having a terminal and a payment card, wherein the payment card communicatively interacts with the terminal so as to effectuate a transaction therethrough, the method comprising the steps of:

changing, in conjunction with a process which increases a balance stored in the card, a symbol stored in the card from a first symbol to a second symbol, comprising the steps of:

detecting, at a beginning of said process, if said first or said second symbol is stored in the card;

if said second symbol is stored, changing said second symbol to said first symbol and performing said process to increase the stored balance; and if said first symbol is stored, indicating that a previous execution of said process was interrupted prior to completion and completing or repeating the previous execution of the process.

7. The method in claim 6 further comprising the step of sending a signal, from a central system to the card and upon completion of the process to increase the balance stored in the card, so as to change the stored symbol from the first symbol to the second symbol.

8. The method in claim 7 further comprising the step of changing, at the beginning of the process to increase the balance stored in the card, the stored symbol from the second symbol to the first symbol.

9. The method in claim 8 further comprising the step of changing the stored symbol from the second symbol to the first symbol as a result of a WRITE instruction executed by the card.

10. The method in claim 7 further comprising the step of changing the stored symbol from the first symbol to the second symbol as a result of a MODIFY instruction executed by the card.

* * * * *